US005597294A

United States Patent [19]
McGrath

[11] Patent Number: 5,597,294
[45] Date of Patent: Jan. 28, 1997

[54] ELECTROMAGNETIC LINEAR COMPRESSOR WITH ROTATIONAL BEARING BETWEEN SPRINGS

[75] Inventor: Michael A. McGrath, Hayling Island, United Kingdom

[73] Assignee: Pegasus Airwave Limited, Waterlooville, England

[21] Appl. No.: 556,901

[22] PCT Filed: Jun. 2, 1994

[86] PCT No.: PCT/GB94/01193

§ 371 Date: Nov. 29, 1995

§ 102(e) Date: Nov. 29, 1995

[87] PCT Pub. No.: WO94/28306

PCT Pub. Date: Dec. 8, 1994

[30] Foreign Application Priority Data

Jun. 2, 1993 [GB] United Kingdom .................. 9311385

[51] Int. Cl.[6] .............................. F04B 35/04; F04B 39/00; F16J 1/24
[52] U.S. Cl. ................................................ 417/417
[58] Field of Search ............................. 417/417; 92/31, 92/32, 162 P

[56] References Cited

U.S. PATENT DOCUMENTS 2,954,917 10/1960 Bayer ....................................... 417/417
4,090,816 5/1978 Takahashi ........................... 417/417 X
4,357,915 11/1982 Monsour ................................. 92/187 X
4,718,832 1/1988 Takahashi ............................... 417/417
4,799,421 1/1989 Bremer et al. ...................... 417/418 X
4,854,833 8/1989 Kikuchi et al. ......................... 417/417
4,867,656 9/1989 Hirose ................................. 417/550 X
4,966,533 10/1990 Uchida et al. ...................... 417/417 X
5,100,304 3/1992 Osada et al. ........................... 417/417

FOREIGN PATENT DOCUMENTS 2041092 9/1980 United Kingdom .

Primary Examiner—Richard E. Gluck
Attorney, Agent, or Firm—Larson and Taylor

[57] ABSTRACT

An electromagnetic linear compressor has a linearly reciprocating piston (10) biased in one direction by a helical coil spring system. A rotational bearing (40) supports one end of the spring system (20a, 20b). To avoid uneven wear due to forces applied by the spring system, the spring system comprises two helical coil springs (20a, 20b) acting in series to bias the piston (10), and the rotation bearing (40) transmits thrust between the two springs while permitting relative rotation of the two springs about their common axis. The compressor also has a turbine (30) for exerting a unidirectional rotational force to rotate the piston (10) about its axis gradually during operation of the compressor.

7 Claims, 5 Drawing Sheets

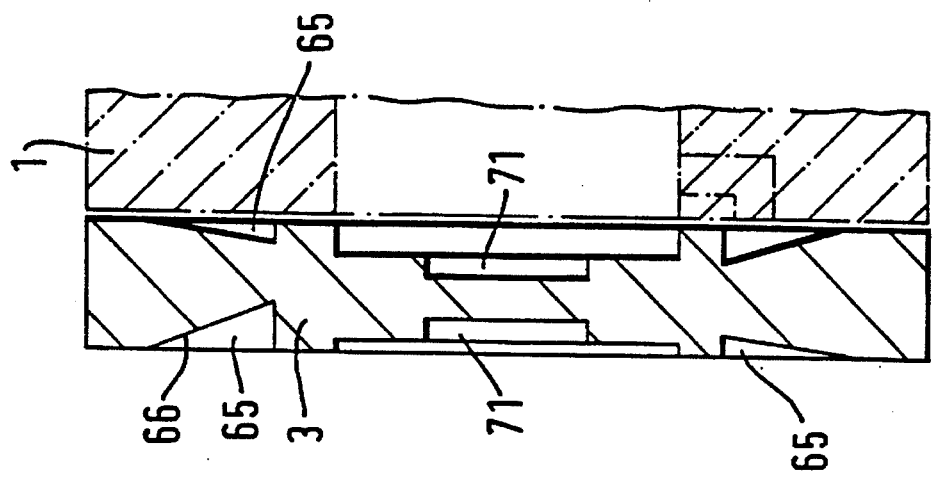
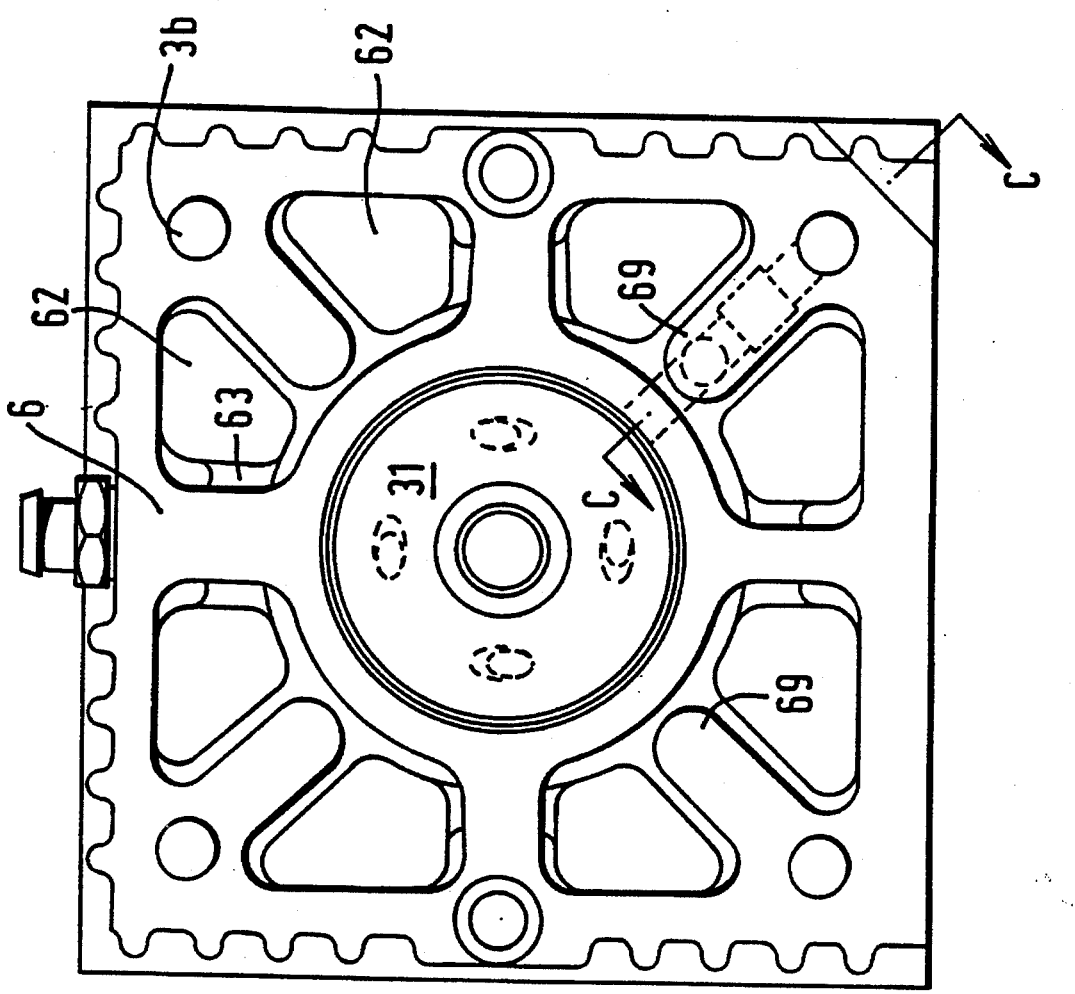

ELECTROMAGNETIC LINEAR COMPRESSOR WITH ROTATIONAL BEARING BETWEEN SPRINGS

TECHNICAL FIELD

This invention relates to electromagnetic reciprocating compressors or pumps, particularly compressors for pumping gas such as air. Such devices can also act as vacuum pumps, but the term "compressor" will be used generally in this specification and claims for convenience.

BACKGROUND ART

Such compressors, which may pump relatively large amounts of air with little compression, have an axially reciprocating piston carrying an armature which is moved through a magnetic field generated by one or more coils. The return stroke of the piston is typically caused by a compression spring. There are many examples of such compressors in the prior art, and reference is made to the following patent specifications as examples, particularly of interest in relation to the present invention:

GB-A-2041092, US-A-4854833 or GB-A-2206931), US-A-4090816, (or GB-A-1529597) US-A-4718832, US-A-4867656 and US-A-5100304.

Such compressors are required to operate without lubrication and with as little maintenance as possible, for long periods. Their typical rate of operation is the mains frequency, e.g. 50 Hz or 60 Hz. Consequently, the compressor must be designed so that wear caused by the moving piston is minimized, so as to avoid the creation of leakage paths which lead to inefficiency. Another problem is noise, particularly where the compressor is to be used in a quiet environment such as a hospital. Noise may arise as a result of wear of the piston or a surface which it contacts, or from contact of the piston with the cylinder head.

The simplest and most reliable form of return spring for the piston in such an electromagnetic linear compressor is a helical coil spring, applied at one end to the movable piston and at its other end to a fixed abutment. A coil spring cannot be fully constrained laterally, because of its radial expansion and contraction during compression and relaxation. Due to asymmetry in the spring, or in its mounting, it tends to deflect from a truly axial position, thus applying lateral force to the piston, which may result in uneven wear. Also, the compression of a coil spring causes a torsional force to be applied between its ends. It has been proposed (in US-A-5100304) to support the coil spring rotatably at one end against the pump casing by means of a spring retainer seated on a spherical ball, so that the spring causes the piston to rotate gradually by torsional forces generated as the spring returns to its relaxed state. The stated aim is to prevent the piston from suffering uneven wear. US-A-5100304 itself proposes a modification of the same principle, in which the spring retainer is supported by a ball bearing having a plurality of balls spaced from the axis. The aim is firstly to cause the piston gradually to rotate during the reciprocating movements of the piston, as a result of the torsional forces of the spring, and secondly, due to the mounting of the spring retainer, to prevent the coil spring from flexing away from its central axis and exerting radial biassing forces on the piston. It is not clear from these disclosures how the use of a low-friction or substantially friction-free mounting of one end of the coil spring will result in a gradual rotation of the piston in a consistent unidirectional manner. It seems more probable that the effect will be a small reciprocating rotation of the piston about its axis, which will not solve the problem of uneven wear. This is discussed more below.

DISCLOSURE OF THE INVENTION

It is an object to the present invention to reduce or minimize the effects caused by the torsional forces exerted by the spring and the tendency of the spring to deflect from its axis.

In accordance with the present invention in a first aspect there is provided an electromagnetic linear compressor having a linearly reciprocating piston biassed in one direction by a spring system comprising two helical coil springs acting in series to bias the piston and a rotational bearing permitting relative rotation of the two springs about their axis, transmitting thrust between the two springs. A first advantage of this arrangement is that, compared with the case where a single compression spring is used, each spring is shorter, so that there is less tendency for it to deflect from the desired axial alignment, or the forces due to such a tendency to deflect are less. Secondly, by providing the rotational bearing between the two springs, rather than at one end of single spring as in the prior art discussed above, the outer ends of the spring system can be located more accurately in axial alignment on the piston axis.

Preferably the coiling senses of the two springs are opposite. In this way the rotational effects due to the torsional forces exerted by the springs can be mainly or entirely cancelled. It may also be that the tendency of the spring system to deflect axially is reduced or eliminated by employing springs of opposite coiling senses. Preferably the two springs have substantially the same spring constant and substantially the same number of turns.

The rotational bearing between the springs may be a ball bearing, or may have low-friction bearing surfaces, e.g. provided by freely rotatable washers of low-friction material.

This aspect of the invention, the use of a spring system with two springs and a rotational bearing between them, is especially advantageous when combined with the next aspect of the invention to be described.

As mentioned above, it is not clear how in the prior art devices using a rotational bearing for one end of the spring, the desired effect of gradual rotation of the piston is achieved. If the spring applies a rotational force, this would be a bi-directional force. Experiments by the present inventors suggest that in practice no gradual rotation of the piston takes place in such a construction. As mentioned, a gradual rotation during operation, which can be very slow, is desirable in order to eliminate effects of uneven wear due to uneven lateral forces on the piston.

According to the present invention in another aspect, there is provided an electromagnetic linear compressor having a piston moved reciprocatingly along an axis and means exerting a unidirectional rotational force to rotate the piston about said axis gradually, during operation. Where the piston is biased in one direction by one or more coil springs, this means for applying unidirectional rotational force is other than the coil spring or springs. Preferably the means for exerting unidirectional rotational force acts by a turbine effect, for example, at least one surface of the piston is arranged in relation to the flow of gas being compressed by the compressor, so that the gas flow exerts the rotational force. Such a surface may be a fin or fins on the piston, or an angled aperture or apertures in the piston head. Alternatively, a magnetic arrangement can be conceived, to achieve the desired unidirectional rotational effect.

In general, care should be taken that the means providing the unidirectional rotational force does not exert a lateral force on the piston, which might increase wear.

Particularly where the piston is biased axially by a coil spring system having two springs and a rotational bearing between them as described above, the gradual rotation of the piston by the means providing unidirectional rotational force is rendered easier, since any inhibition of the rotation of the piston due to uneven lateral forces or uneven forces in a rotational bearing are avoided, due to the reduction or neutralization of rotational forces exerted by the spring system.

The gradual unidirectional rotation of the piston improves the piston life by changing the piston attitude relative to deflectional forces applied by the spring or by the electromagnetic drive. The result is the minimization of uneven wear.

BRIEF DESCRIPTION OF THE DRAWINGS

An embodiment of the invention will now be described by way of non-limitative example, with reference to the accompanying drawings. In the drawings:

FIG. 5 is an end view in the same direction as FIG. 4 with the head gasket and the piston flap valve in place.

FIG. 7 is a cross-section of a modified form of the cylinder head shown in FIG. 6.

BEST MODE FOR CARRYING OUT THE INVENTION

Figure 1:
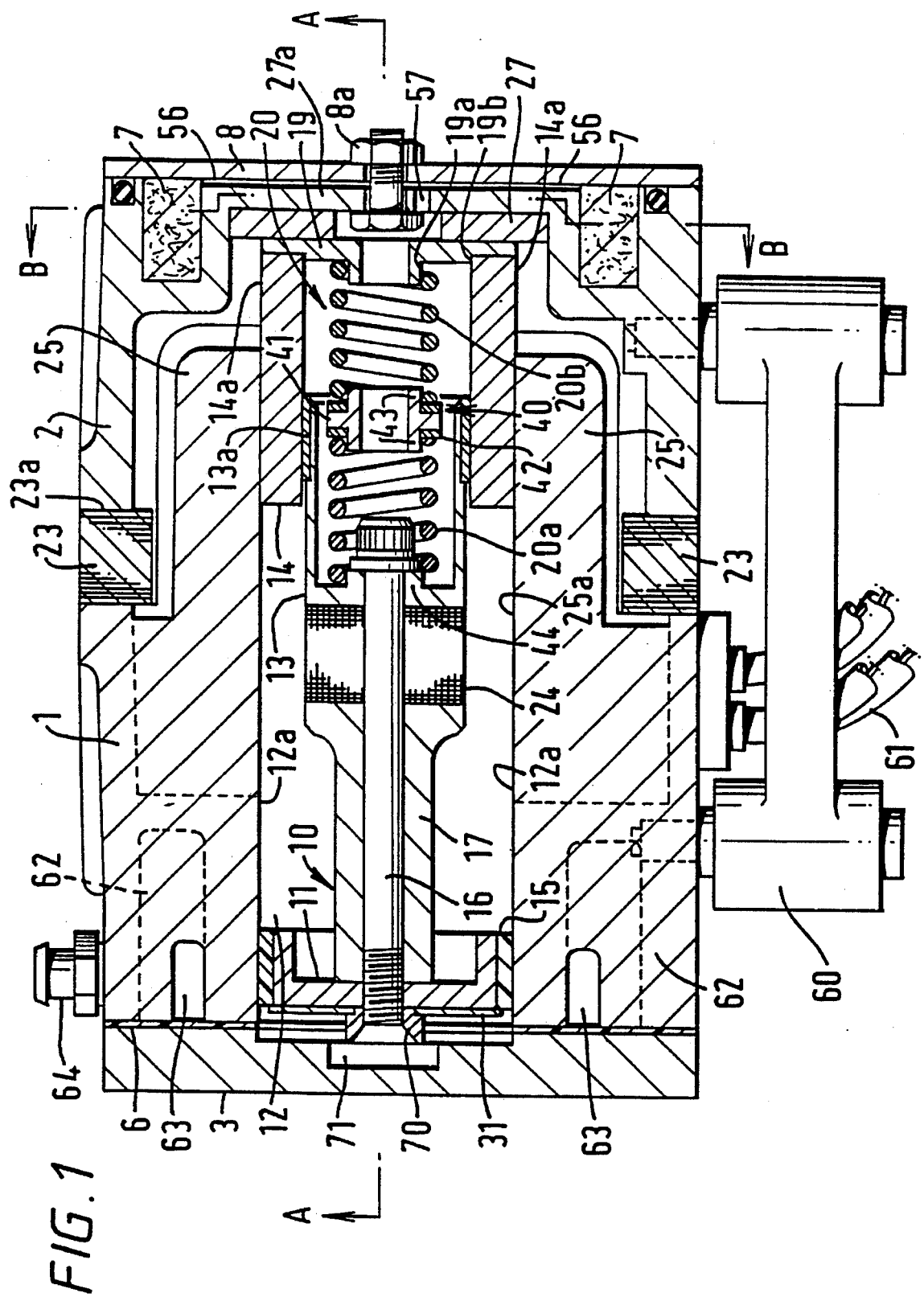
FIG. 1 is an axial cross-sectional view of the embodiment of an electromagnetic linear compressor according to the invention.

The compressor shown in the drawings has a body composed of a main body 1 of square exterior cross-section transverse to the axis and a rear body 2 secured together by bolts 4 (FIG. 2) with washers 5. The bodies 1,2 are ribbed for cooling and strength. A cylinder head 3 is secured by bolts 3a (FIG. 6) in threaded holes 3b to the main body 1, with a one-piece sealing head gasket 6 of thin flexible plastics material, in this instance Melanex™, interposed between them.

The rear body 2 has an annular recess housing a filter 7 for the air passing through the compressor, covered by an end plate 8 secured to the rear body by nut and bolt 8a or similar.

Axially reciprocatingly movable within the compressor is a piston 10 with a piston head 11 located within a cylinder 12 in the body 1 and a rear guide piston 13 slidably located in a piston guide 14 mounted in the main body 1 as described below. The piston head 11 has its peripherally outermost surface provided by an in situ moulded continuous band 15 of plastics material, to minimize leakage of air past the piston.

Within the main body 1 are electromagnetic drive coils 22 (FIG. 2) and between the main body 1 and the rear body 2 there is a stator 23 composed of a conventional stack of magnetically permeable laminations. The piston 10 carries an armature 24 which is driven linearly by the coils 22 and the stator 23, in a known manner, so that the piston 10 is reciprocatingly driven by the linear motor thus constituted in one direction and by the restoring force of a spring arrangement 20 described below in the other direction. The reciprocation frequency is in accordance with the frequency of the applied AC voltage. The details of this driving arrangement need not be described further since it is well known.

FIG. 1 shows that the cylinder surface 12a of the cylinder 12 is extended continuously rearwardly as inner surfaces 25a of two rearwardly projecting arms 25 of the body 1, these arms projecting through the stator 23. The inner surfaces 25a of these arms 25 are thus part-cylindrical surfaces of the same diameter as the cylinder surface 12a, and are formed in the same machining operation as the cylinder surface 12a, so as to have a very high degree of concentricity and coaxiality with the cylinder surface 12a. A typical forming process for these cylindrical surfaces 12a, 25a is first a boring operation of the body part 1, followed by anodizing of the surfaces 12a,25a, and then by a highly accurate honing of the surfaces 12a,25a in a single honing operation by reference to a common axis.

The rear ends of the surfaces 25a form registration surfaces for the exterior peripheral cylindrical surface 14a of the piston guide 14. This exterior cylindrical surface 14a of the guide 14 is also highly accurately machined so as to form an accurate register fit within the surfaces 25a, thus locating the piston guide 14 with a high degree of concentricity with the cylinder surface 12a. This achieves accurate radial location of the piston guide 14. The axial location of the piston guide 14, in abutment with the stator 23 is achieved in this embodiment by a resilient rubber compression body 27 and a spring support 19 to be described below located between the piston guide 14 and an opposed end wall 27a of the rear body 2. Electrical isolation of the piston guide 14 from the main body 1 is achieved by the anodization of the mutually contacting surfaces 14a, 25a of these parts.

The endmost one 23a of the laminations of the stator 23, which is abutted by the piston guide 14, is not a metal lamination but is a sheet of an electrically insulating material, such as a plastics material, in order to electrically isolate the piston guide 14 from the stator 23. The abutment of the piston guide 14 with this endmost lamination of the stator axially locates the piston guide 14. The piston guide 14 is thus resiliently clamped against the rigid stator 23 by the end wall 27a, through the resilient body 27.

As mentioned above, the piston head 11 has an in situ moulded continuous band 15 of low-friction plastics material acting as a piston ring. The guide piston 13 also has around its periphery an in situ moulded continuous band 13a of plastics material acting as a slide surface for the guide piston 13 on the piston guide 14. There may be recesses, in which these bands 13a,15 are moulded, in the form of short screwthreads on the guide piston 13 and the piston head 11 respectively, since such screwthreads provide good keying for the plastics material and are easily formed. The low-friction plastics material used for the bands 13a, 15 in this embodiment of the invention is injected moulded to a thickness of about 1 mm. The material used is PPS (polyphenylene sulphide) blended with a percentage of a lubricating medium and a percentage of reinforcing fibre. This is machined after moulding to achieve highly accurate concentricity with the piston head or guide piston. A particular advantage of this material is that it has almost the same coefficient of thermal expansion as aluminium, of which the piston head 11 and the guide piston 13 are conveniently made. The difference of coefficient of thermal expansion between the piston head or guide piston and the material of the piston ring bands 13a, 15 is preferably less than $2 \times 10^{-6}$/K.

Figure 2:
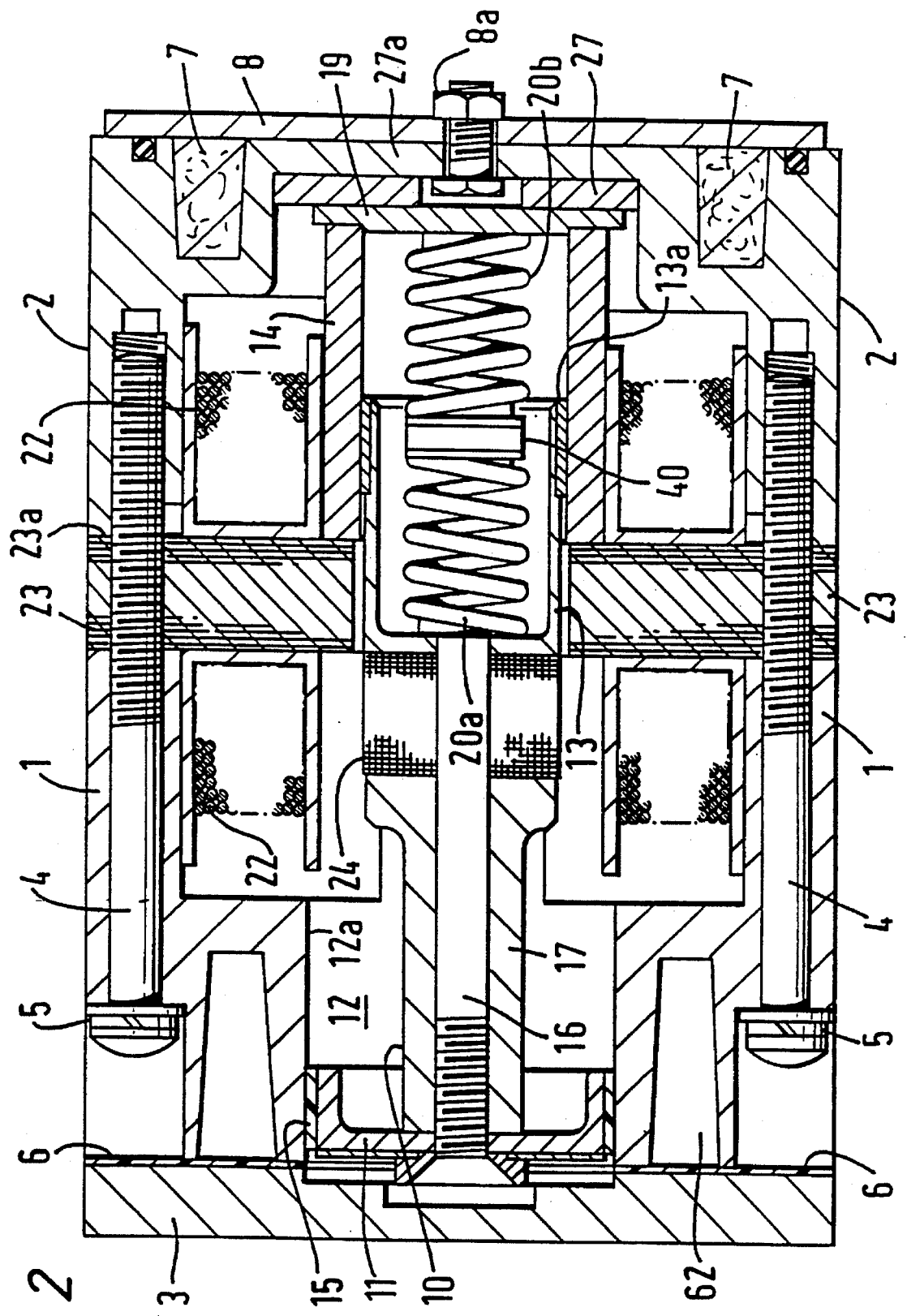
FIG. 2 is a cross-section on the line A—A of FIG. 1.

It can be seen in FIGS. 1 and 2 that the portions of the piston guide 14 which do not contact the surfaces 25a of the body projections 25 are thinner walled, in order to avoid the coils 22.

The piston 10 is in several parts, secured together by a bolt 16. The bolt 16 passes through the guide piston 13 and the armature 24 and is screwthreadedly engaged in a spacer part 17. After the part 17 has been tightly threaded onto the bolt 16, the piston head 11 is also tightly screwthreadedly attached to the bolt 16. Finally, after location of a flap valve 31 on the piston face, a nut 70 is secured on the bolt 16 to hold the flap 31 in place.

Figure 3:
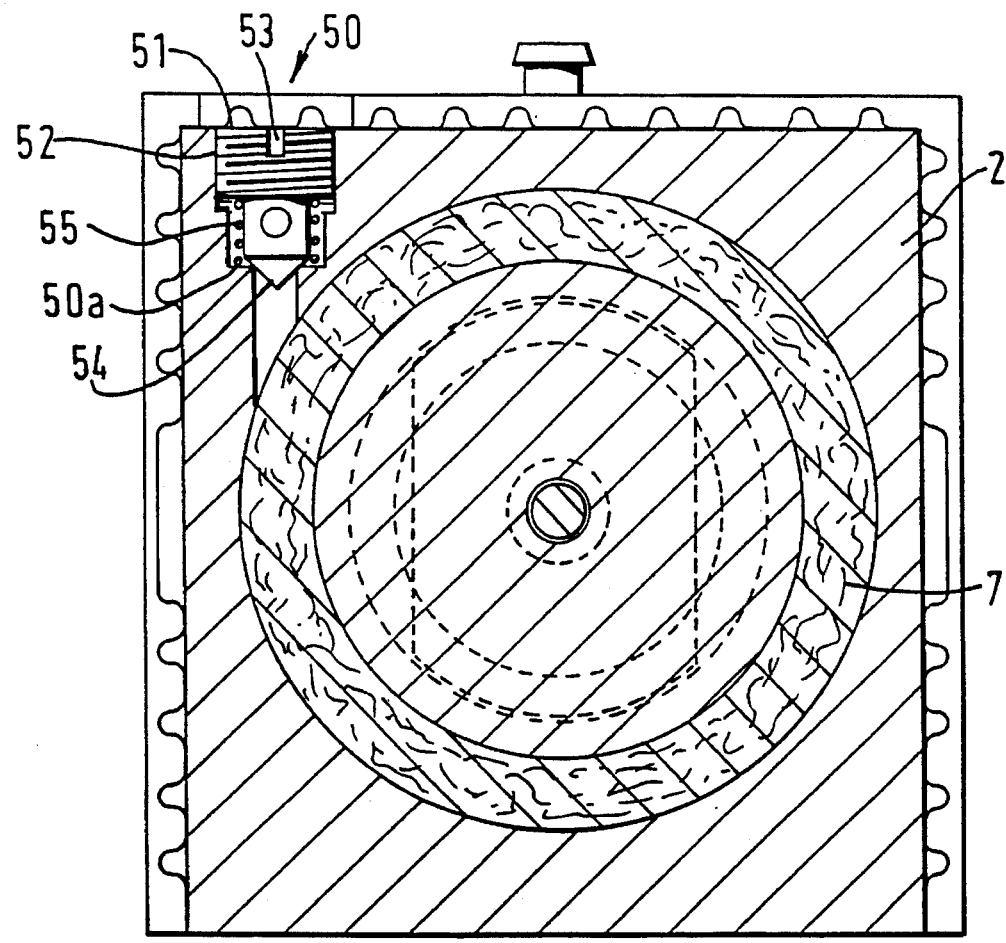
FIG. 3 is a cross-section on the line B—B of FIG. 1.

FIG. 3 shows an air inlet passage 50 in the rear body part 2 having in it a flow-control valve body 51, which is screwthreadedly engaged with a screwthread 52 in the wall of the passage 50 and is thus adjustable in position along this screwthread 52. An air passage 53 allows the air to pass through the valve body 51, and the flow of air into the compressor is controlled by the positioning of a conical leading end 54 of the valve body 51 relative to an opposed shoulder 50a of the passage 50. A spring 55 acts on the valve body 51 to prevent its accidental rotation due for example to vibration.

The passage 50 leads to the outside surface of the filter 7. Air passing through the filter 7 goes into a small gap 56 (FIG. 1) between the end plate 8 and the rear body 2, and then via passages 57 in the rear body 2 to inside the compressor, where it flows over the coils 22 to cool them in order to reach the back face of the piston head 11. This tortuous inlet path for the air helps to reduce noise emitted by the compressor.

Figure 4:
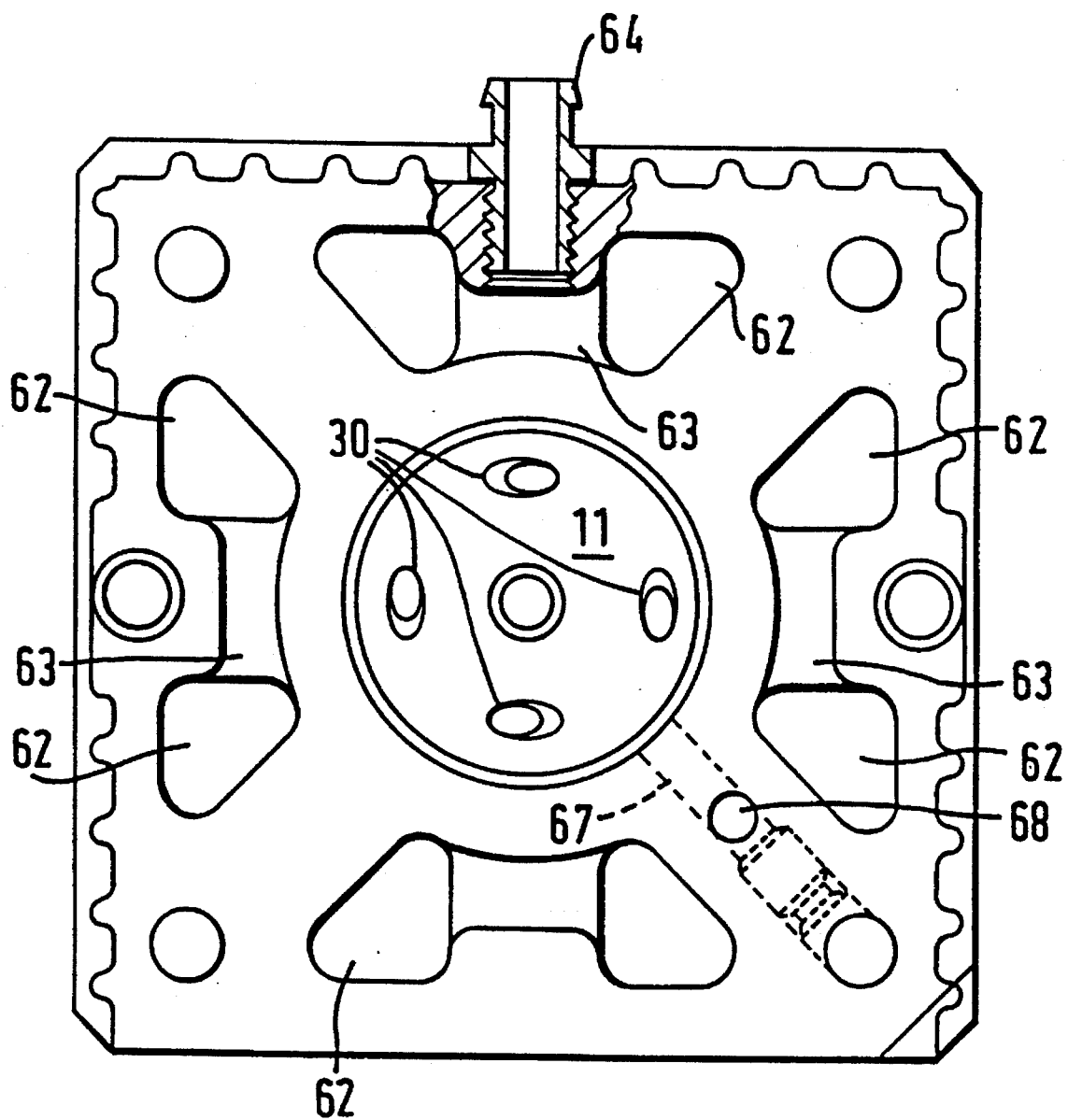
FIG. 4 is an end view, partly sectioned, of the main body of the compressor of FIG. 1, with the cylinder head, head gasket and piston flap valve removed.

FIG. 4 shows that the piston head 11 has four apertures 30 (not shown in FIGS. 1 and 2) through it, which are covered at the head face of the piston head 11 by the flexible flap 31 (FIG. 1) to form a conventional flap valve, for admission of air from within the body of the compressor to the cylinder space in front of the piston on the reverse stroke of the piston. These apertures 30 in the piston head 11 are angled with respect to the axis of the piston. The axis of each aperture 30 is preferably about 30° to the axis of the compressor. A suitable range for this angle is 10° to 45°. The effect of this angling of the apertures 30 is that the air, moving rapidly through these apertures during the return stroke of the piston, applies a unidirectional rotational driving force on the piston by a turbine-like effect, rotating it slightly about its axis. This continual gradual unidirectional rotation about the axis minimizes the unevenness of any wear on the piston and cylinder surfaces of the compressor, i.e. renders such wear as uniform as possible. In combination with the lack of deflection forces and torsional forces from the spring system 20 described below, a predetermined and desired gradual rotation of the piston, due to this turbine effect of the air in the apertures 30, can be achieved. Since the torsional and deflection effects of the springs can be ignored, the desired rotational effect on the piston by the turbine effect is reproducible, in mass production of the compressor. In the present embodiment, a rotational speed of the piston of about 30 rpm has been achieved (the piston reciprocates at 50 Hz).

Instead of the holes 30 on oblique axes, stepped holes (i.e. holes having portions circumferentially stepped around the piston axis) may be used, to achieve the effect of oblique air flow through the piston which causes its rotation.

Turning now to the compression spring arrangement 20 shown in FIGS. 1 and 2 this has two helical springs 20a and 20b, of mutually opposite helical coiling sense, arranged in series with a rotational bearing 40 mounted between their mutually opposed ends. The bearing 40 is supported only by the springs 20a, 20b and consists of a body 41 having axially projecting spigots 43 which radially locate the ends of the springs 20a, 20b. Around the spigots 43 are low-friction washers 42 on which the ends of the springs 20a, 20b bear. These washers are freely rotatable about the axis of the bearing 40 and are made of moulded PPS containing a lubricating medium and reinforcing fibre. The outer ends of the springs 20a and 20b are received respectively on an axial projection 19a on the spring support 19 and axial projection 44 of the guide piston 13.

The rotational bearing 40 is freely movable radially and axially, so that it provides no constraint against any flexing of the spring system. It allows free relative rotational movement of the inner ends of the springs 20a and 20b, so that no net rotational force is applied by the springs to the piston 10. The opposite coiling senses of the two springs 20a and 20b tend to mean that their torsional forces are cancelled. Because they are relatively short, their tendency to deflect from the axis is small, and the free rotation of one end of each of them also reduces this tendency to deflect.

The spring support 19 is radially located relative to the piston guide 14 by a shoulder 19b which makes a register fit with the rear end of the piston guide 14.

FIG. 1 shows a mounting bracket 60 of the compressor and electrical leads 61, these parts being omitted from the other drawings, for simplicity.

The cylinder outlet valve and air flow arrangements at the cylinder head end will now be described.

FIGS. 1, 2 and 4 show that the cylinder body 1 has in it at its forward end face eight deep recesses 62 which are arranged in pairs, the two members of each pair being joined in each case by one of four shallower recesses 63 in the body end face. One of these shallower recesses 63 is in communication with the outlet 64 of the compressor. In order to provide communication between these respective groups of recesses 62,63, the cylinder head 3 has four recesses 65 in its face opposing the main body 1. The recesses 65 have sloping or bevelled rear faces 66 (two of these recesses can be seen in FIG. 6). Each of these recesses 65 is of a size so as to provide communication between two adjacent non-communicating deep recesses 62 of the main body 1. Thus around the head end of the cylinder there is a continuous gallery for movement of air, provided by the recesses 62,63 and 65. This gallery has a tortuous shape, which reduces noise emerging from the compressor. The volume of the gallery also provides a smoothing effect, reducing the pressure pulsing effect of the rapidly moving piston of the compressor.

The gallery just described communicates with the interior of the cylinder 12 via a passage 67 opening in a side wall of the cylinder 12 and terminating at an outlet end 68 in the end face of the body 1, at a location corresponding to one of the recesses 65 of the cylinder head 3. As FIG. 5 shows, the head gasket 6 lying between the cylinder head 3 and the main body 1, which seals around the head end of the cylinder 12, has four inwardly directed integral flap portions 69 one of which covers the outlet end 68 of the passage 67 thus forming a flap valve permitting flow of the compressed air out of the cylinder 12 but preventing reverse flow into the cylinder through the passage 67. This flap portion 69 moves within the recess 65 of the cylinder head 3 between its closed and open positions, and the length of its travel between these positions is determined by the angle of the bevel rear face 66 of the recess 65.

It can be seen from FIG. 5 that the gasket 6 can be mounted in any one of four different positions angularly spaced by 90°, in each of which one of the integral flap portions 69 constitutes the flap valve controlling the flow of air in the passage 67. Likewise the cylinder head 3 can also be secured to the body 1 in any one of four positions, also angularly spaced by 90°. The four different recesses 65 of the cylinder head 3 have respectively different bevel angles of the bevelled rear faces 66. Consequently, the characteristic of the flap valve arrangement at the outlet of the passage 67 is different for each of the four positions of the cylinder head, because the travel of the valve member 69 is different and also the volume of the recess 65 is different in each case.

Furthermore, in the modification shown in FIG. 7, the cylinder head 3 is reversible so that either of its main faces can face towards the main body 1 of the compressor. For this purpose it has four of the recesses 65 on each of its two main faces and it also has two different central recesses 71, so that the effective volume of the cylinder 12 at its head end is different, depending on which of the two reverse positions of the cylinder head 3 is chosen. This again allows some adjustment of the characteristics of the compressor. FIG. 7 also shows different bevel angles of the rear faces of the recesses 65.

These possibilities for adjustment of the characteristics of the compressor allow it to be adapted according to a particular use, depending on the relationship of the volume of air flow and the pressure of the emitted air.

Figure 6:
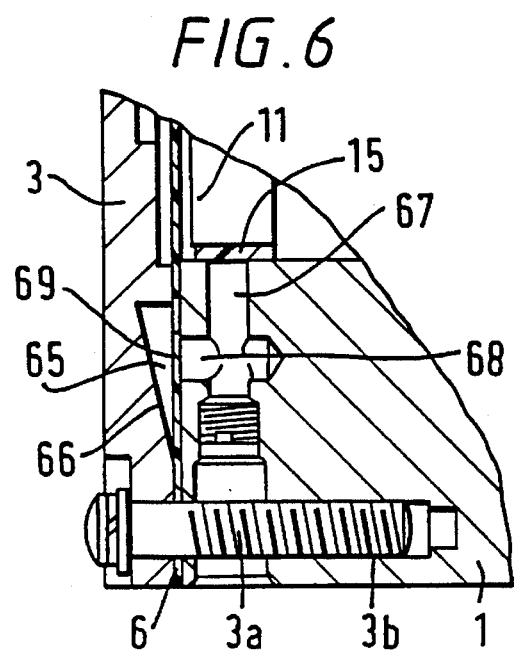
FIG. 6 is a partial section on line C—C of FIG. 5, with the cylinder head in place.

It can be seen from FIG. 6 that when the piston head 11 approaches the limit of its travel towards the cylinder head 3, its ring band 15 closes the outlet passage 67. This means that during the final portion of the travel of the piston, air is compressed between the piston head and the cylinder head, which causes the piston to stop before it hits the cylinder head. Since the band 15 is a one-piece moulded construction and is continuous around the piston head 11, there is no leakage path between the space in front of the piston and the passage 67, in any rotational position of the piston, after the band 15 has come alongside the passage 67.

I claim:

1. An electromagnetic linear compressor including:

a cylinder;

a linearly reciprocating piston with a piston head which travels in the cylinder;

two helical coil springs having a common longitudinal axis and acting in series to bias the piston in a first direction;

a rotational bearing transmitting thrust between said two helical springs;

electromagnetic driving means for driving the piston in a second direction opposite to said first direction;

at least one fluid inlet path to the cylinder having a fluid inlet valve; and at least one fluid outlet path from the cylinder having a fluid outlet valve;

wherein said rotational bearing permits relative rotation of said two helical springs about their common longitudinal axis.

2. A compressor according to claim 1 wherein the coiling senses of the two helical springs are opposite.

3. A compressor according to claim 1 wherein the two helical springs have substantially the same spring constant.

4. A compressor according to claim 1 further having means for exerting a unidirectional rotational force to rotate said piston about its axis gradually during operation of the compressor.

5. A compressor according to claim 4 wherein said means for exerting unidirectional rotational force is at least one surface acted upon by gas being compressed in the compressor.

6. A compressor according to claim 5 wherein said surface is a surface of an aperture in the piston.

7. An electromagnetic linear compressor including:

a cylinder;

a piston movable reciprocatingly along an axis in said cylinder to perform a compression stroke and a reverse stroke;

electromagnetic driving means for driving the piston;

at least one fluid inlet path to the cylinder having a fluid inlet valve;

at least one fluid outlet path from the cylinder having a fluid outlet valve; and said fluid inlet path including at least one aperture in the piston through which the fluid to be compressed flows during said reverse stroke, said aperture having a surface acted on by the flowing fluid so as to exert a unidirectional rotational force on said piston about said axis, thereby to rotate the piston about said axis gradually during operation.

\* \* \* \* \*